Oct. 21, 1930.  J. F. SWINT  1,779,020

STALK CUTTER.

Filed July 10, 1928.

Inventor
J. F. Swint,
By J. Stanley Bunch
Attorney

Patented Oct. 21, 1930

1,779,020

UNITED STATES PATENT OFFICE

JOE F. SWINT, OF BRANDON, TEXAS

STALK CUTTER

Application filed July 10, 1928. Serial No. 291,616.

This invention relates to improvements in stalk cutters, and the primary object of the invention is to provide a machine of simple construction that will rapidly and efficiently cut the standing dry stalks of cotton plants in a field in such manner that they may be easily plowed under.

A further object is to provide a machine of the above kind adapted to simultaneously operate on two rows of stalks, and wherein provision is made for laterally adjusting the pairs of cutting cylinders toward or away from each other for cutting stalks in rows spaced different distances apart or in irregular rows.

The invention consists in the novel form, combination and arrangement of parts hereinafter more fully described, shown in the accompanying drawing and claimed.

Figure 1:
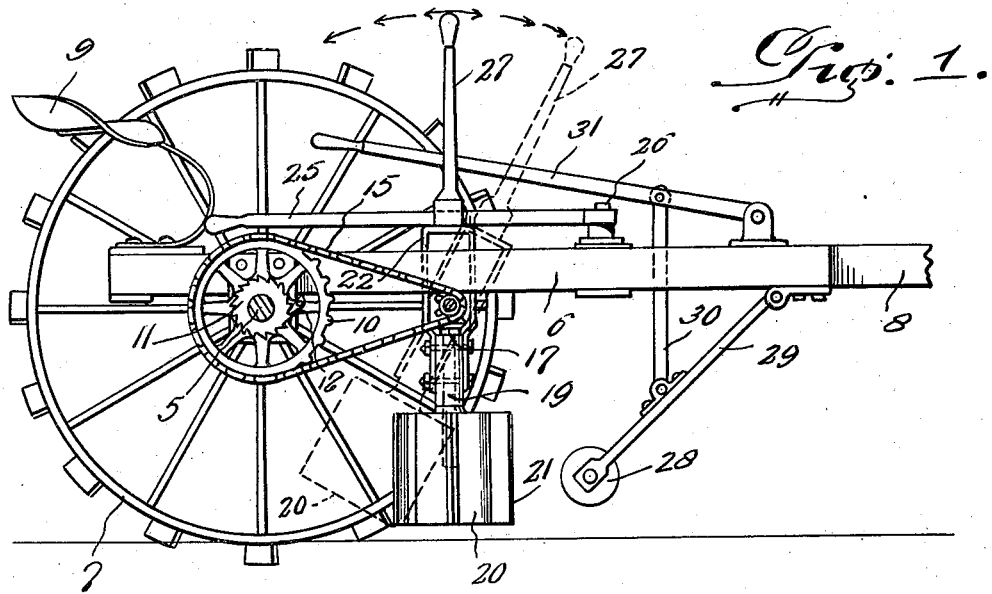
Figure 1 is a vertical longitudinal section of a stalk cutting machine embodying the present invention.
Figure 2:
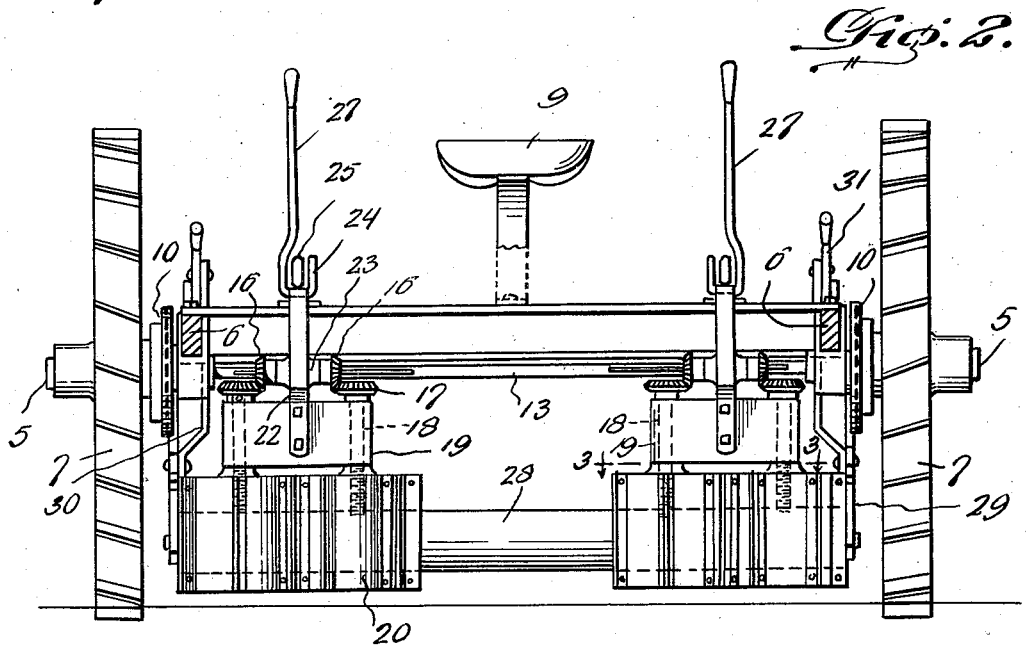
Figure 2 is a view thereof partly in rear elevation and partly in transverse vertical section.
Figure 3:
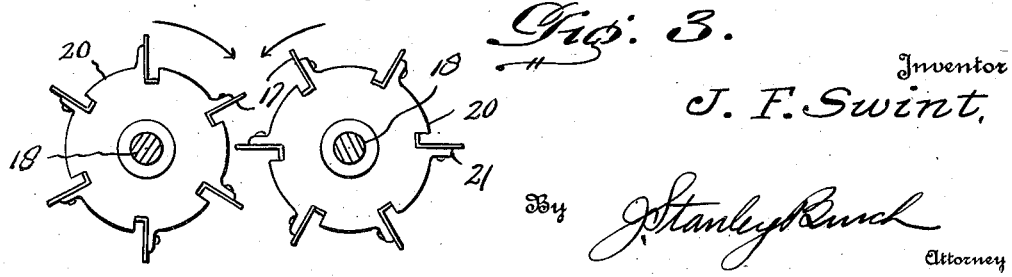
Figure 3 is an enlarged horizontal section on line 3—3 of Figure 2.

The machine embodies an axle 5 on which is secured a suitable frame 6 and on the ends of which are journaled coaxial ground or traction wheels 7. The frame has a suitable draft tongue 8 to which a team or a tractor may be hitched, and mounted on the rear of the frame is a suitable seat 9 for the operator.

Journaled on the axle 5 at the inner sides of the traction wheels 7 are sprocket wheels 10 having ratchet wheels 11 fixed to the hubs thereof, and fixed to the traction wheels are pawls 12 engageable with said ratchet wheels. By virtue of this construction, a differential action may be had between the two traction wheels when turning from a straight line of travel, since one ratchet wheel will be free to over-ride the pawl which normally actuates it.

Journaled on the under side of the frame 6 in front of the axle 5 is a transverse horizontal shaft 13 having small sprocket wheels 14 secured on the ends thereof, and passing each sprocket wheel 10 and the adjacent sprocket wheel 14 is a sprocket chain 15. In this way, the shaft 13 is driven by the traction wheels 7 upon forward travel of the machine.

Slidably keyed on each end portion of the shaft 13 are two bevel gears 16, and meshing with the gears 16 are further bevel gears 17 which are fixed on the upper ends of upright shafts 18 journaled in a frame 19.

Cutting cylinders 20 are fixed to the lower ends of the shafts 18 and have radial cutting blades or knives 21. It is thus apparent that the rotation of shaft 13 is transmitted to the cutting cylinder to cause the knives to mesh and cut the stalks which may be forced between them.

The frames 19 are pivotally and slidably supported from the shaft 13 by the arms 22 and hubs 23 so that the lower ends of the cutting cylinders are disposed adjacent the ground, and so that the pairs of cutting cylinders may be tiltably adjusted longitudinally of the machine or slidably adjusted laterally of the machine to properly engage the stalks and to operate on irregular rows or rows spaced different distances apart.

The arms 23 project above the shaft 13 and have forks 24 at their upper ends, in each of which is engaged a horizontally swinging lever 25 pivoted at its forward end on the frame 6 as at 26 and extending rearwardly within reach of the driver's seat 9. By swinging the levers 25, the pairs of cutting cylinders may be separately adjusted laterally in either direction. Rigid with and rising from one leg of each fork 24 is a hand lever 27 by means of which the pairs of cutting cylinders may be independently tiltably adjusted, and any suitable means may be employed to hold the levers 27 in their different positions of adjustment.

A transverse horizontal roller 28 is suspended from the frame 6 in front of the cutting cylinders, so that when it comes in contact with the standing stalks, the latter will be bent over forwardly in position to be entirely subjected to the action of the cutting cylinders. The roller 28 is mounted at the ends in the lower ends of swinging hanger arms 29 that are connected by links 30 to vertically swinging lever 31 pivoted on the frame 6. By manipulating either of the levers 31, the roller 28 may be vertically adjusted to the desired height, any suitable means being used to maintain the adjustments.

In use, the machine is drawn lengthwise of the rows of stalks so that the stalks of two rows are simultaneously bent over to pass between the pairs of cutting cylinders and be chopped into short lengths.

Minor changes may be made without departing from the spirit of the invention as claimed.

What I claim as new is:

1. A stalk cutter including a frame, traction wheels supporting the frame, a transverse horizontal driving shaft carried by the frame adapted to be rotated by the traction wheels, two spaced pairs of upright cutting cylinders suspended from said driving shaft, said pairs of cutting cylinders being laterally adjustable relative to each other, means to independently laterally adjust said pairs of cutting cylinders, said pairs of cutting cylinders being further mounted for tiltable adjustment longitudinally of the frame, means to independently tilt said pairs of cutting cylinders, and means to transmit power from the driving shaft to said cutting cylinders in any laterally adjusted position thereof.

2. A stalk cutter including a frame, traction wheels supporting the frame, a transverse horizontal driving shaft carried by the frame adapted to be rotated by the traction wheels, two spaced pairs of upright cutting cylinders suspended from said driving shaft, said pairs of cutting cylinders being laterally adjustable relative to each other, longitudinally swinging arms suspended from the frame in front of said cutting cylinders, a transverse horizontal roller journaled in the lower ends of said arms and adapted to bend the stalks forwardly for passage between the cutting cylinders, vertically swinging levers connected to said arms to manually raise and lower the roller, and means to transmit power from the driving shaft to said cutting cylinders in any laterally adjusted position thereof.

In testimony whereof I affix my signature.

JOE F. SWINT.